United States Patent [19]

Sakakibara et al.

[11] Patent Number: 4,767,802

[45] Date of Patent: Aug. 30, 1988

[54] EPOXY RESIN COMPOSITION

[75] Inventors: Toshimori Sakakibara, Shiga; Hirohide Tomoyasu, Moriyama, both of Japan

[73] Assignee: Sunstar Giken Kabushiki Kaisha, Takatsuki, Japan

[21] Appl. No.: 110,271

[22] Filed: Oct. 20, 1987

[30] Foreign Application Priority Data

Oct. 20, 1987 [JP] Japan .................. 61-249827

[51] Int. Cl.$^4$ .......................... C08K 3/36; C08K 3/35; C08K 3/26; C08K 3/04
[52] U.S. Cl. ..................... 523/204; 523/440; 523/443; 523/457; 523/467; 523/468
[58] Field of Search ............ 523/204, 205, 443, 440, 523/457, 467, 468; 427/222; 428/404, 407

[56] References Cited

U.S. PATENT DOCUMENTS

| | | | |
|---|---|---|---|
| 2,895,939 | 7/1959 | Stober et al. | 428/407 |
| 3,436,243 | 4/1969 | Kruger | 428/404 |
| 3,846,365 | 11/1974 | Berg et al. | 524/525 |
| 3,920,604 | 11/1975 | Berg et al. | 523/333 |
| 3,923,707 | 12/1975 | Berg et al. | 526/337 |
| 3,972,821 | 8/1976 | Weidenbenner et al. | 523/437 |

*Primary Examiner*—Lewis T. Jacobs
*Attorney, Agent, or Firm*—Wegner & Bretschneider

[57] ABSTRACT

Epoxy resin composition comprising a uniform mixture of an epoxy resin and fine particles of a rubber adhered uniformly on the surface thereof with fine particles of an inorganic material, said composition having improved peel strength and toughness when cured and being useful as an adhesive or a molding material.

12 Claims, No Drawings

EPOXY RESIN COMPOSITION

This invention relates to an improved epoxy resin composition, more particularly to an epoxy resin composition comprising an epoxy resin and fine particles of a rubber adhered uniformly on the surface with fine particles of an inorganic material, which shows improved peel strength and toughness when cured and is useful as an adhesive or a molding material.

PRIOR ART

An epoxy resin composition is generally brittle when cured, and hence, when the composition is used as an adhesive, the adhered product has low peel strength, and further, when it is used as a molding material, the molded product is undesirably brittle.

In order to eliminate the above drawback, it has been proposed to take the measure of external plasticizing by incorporating a polysulfide polymer or a urethane resin into the epoxy resin composition or internal plasticizing by incorporating a flexible epoxy resin into the epoxy resin. However, according to the external plasticizing, the cured product has significantly lower elastic modulus, and according to the internal plasticizing, the cured product has significantly lower heat distortion temperature.

Besides, it has also been tried to improve the peel strength and toughness of a cured product of an epoxy resin by incorporating rubber particles into the epoxy resin and thereby adsorbing the external stress thereof, but there could never been obtained satisfactory results. That is, in order to adsorb the external stress given to the product, rubber fine particles must uniformly be dispersed into the epoxy resin composition, but it is very difficult to prepare the desired fine particles of rubber by a conventional freeze pulverization method, and the conventional rubber particles can not uniformly be dispersed into the epoxy resin composition. In addition to the problem that the conventional particles have a large particle size, in case of using a rubber having less binding property with the epoxy resin, such as vulcanized rubber, the interface of the resin and rubber particles is broken (failed). On the other hand, when a rubber having a good compatibility with the epoxy resin is used in order to prevent the above defect, the rubber particles are dissolved and disappeared with lapse of time. Thus, the incorporation of the conventional rubber particles can not give the desired effect.

SUMMARY DESCRIPTION OF THE INVENTION

Under the circumstance, the present inventors have intensively studied to find an improved epoxy resin composition having improved peel strength and toughness when cured without drawbacks as mentioned above, and have found that the desired epoxy resin composition can be obtained by mixing uniformly the epoxy resin with rubber fine particles which are prepared by treating a rubber latex with fine particles of an inorganic material. That is, it has been found that when fine particles of an inorganic material are dispersed in a rubber latex, followed by drying, said fine particles of the inorganic material are adhered onto the surface of primary particles of the rubber contained in the latex to give very fine particles of rubber, and hence, when the fine particles of rubber are uniformly dispersed into the epoxy resin, there can be obtained the desired composition which can give a cured product having extremely improved peel strength and toughness without problems such as lowering of elastic modulus and heat distortion temperature.

An object of the invention is to provide an improved epoxy resin composition having improved peel strength and toughness when cured. Another object of the invention is to provide an epoxy resin composition comprising a uniform mixture of an epoxy resin and fine particles of a rubber adhered uniformly on the surface thereof with fine particles of an inorganic material. These and other objects and advantages of the invention will be apparent to persons skilled in the art from the following description.

DETAILED DESCRIPTION OF THE INVENTION

The epoxy resin composition of the invention can be prepared by mixing uniformly an epoxy resin with fine particles of a rubber, said rubber fine particle being prepared by uniformly dispersing fine particles of an inorganic material in a rubber latex, followed by drying. In the epoxy resin composition of the invention, rubber fine particles having a sufficiently small particle size are dispersed in the resin, and hence, there is no problem of interface failer between the resin and rubber particles as observed in the known resin composition. Besides, since the fine particles of an inorganic material are adhered onto the particles of rubber, there is no problem of dissolving and disappearance of particles, and the particles can adsorb sufficiently the external stress, and thereby the cured product can show sufficient toughness (no more brittle). Accordingly, the epoxy resin composition of the invention is useful as an adhesive which is required to have high peel strength or as a molding material which is required to have high toughness, in combination of various curing agents, such as a curing agent which is curable at room temperature, or a curing agent which is curable at an elevated temperature.

The rubber latex used for preparing fine particles of rubber includes conventional natural or synthetic rubber latexes, such as acrylonitrile-butadiene rubber (NBR) latex, styrene-butadiene rubber (SBR) latex, natural rubber (NR) latex, and the like. The latexes have preferably primary particles of the rubber in a particle size of about 0.01 to 5 $\mu$m. Preferred latexes are NBR latex, particularly carboxylated NBR latex. Preferred commercially available products are, for example, carboxylated NBR latexes, such as Croslene NA-11 (manufactured by Takeda Chemical Industries, Ltd., Japan), Chemigum 550 (Goodyear Co., U.S.A.), and Lacstar 6541G (manufactured by Dainippon Ink and Chemicals, Inc., Japan); and NBR latexes, such as Nipol 1562 and 1577 (manufactured by Nippon Zeon Co., Ltd., Japan), and Chemigum 61A (manufactured by Goodyear Co., U.S.A.).

The fine particles of an inorganic material include fine particles of water-insoluble inorganic materials such as silicic acid or silicate (e.g. silicic anhydride, hydrous silicic acid, etc.), talc, calcium carbonate, carbon black, and the like. The fine particles have preferably a particle size of about 0.01 to 15 $\mu$m. Preferred commercially available products are, for example, Carplex #80 (manufactured by Shionogi & Co., Ltd., Japan), Nipsil VN$_3$ (hydrous silicic acid, manufactured by Nippon Silica Kogyo K.K., Japan), Aerosil #200 (silicic anhydride, manufactured by Nippon Aerosil K.K., Japan), Hisil (hydrous silicic acid, manufactured by PPG, U.S.A.), Asahi #80 (carbon black, manufactured by Asahi Carbon K.K., Japan), Talc SW (talc, manufactured by Asada Seifun K.K., Japan), and the like. Silicic acid and silicates are preferable, because they can give the fine particles of rubber having excellent properties.

The fine particles of a rubber used in this invention can be prepared by adding fine particles of a water-insoluble inorganic material to a rubber latex in an amount of the fine particles of preferably 30 to 300 parts by weight, more preferably 40 to 80 parts by weight, per 100 parts by weight of the solid component of the rubber latex, mixing with stirring the mixture by a conventional method, for example, with a stirrer, a homomixer, or a dispersion mixer, by which the fine particles are uniformly dispersed in the latex. Thereafter, the mixture of the rubber latex and the fine particles of a inorganic material is dried by a conventional method, such as spray drying, flash drying, carbon black co-precipitating method, and the like, and thereby, there are obtained fine particles wherein the fine particles of an inorganic material are adhered on the surface of the fine particles of a rubber. Optionally, the resulting particles are further pulverized and screened to collect fine particles having a particle size of not more than about 200 μm (passed through 70 mesh screen), more preferably not more than about 50 μm (passed through 270 mesh screen).

The composition of this invention is prepared by mixing uniformly the fine particles of a rubber obtained above in an epoxy resin by a conventional method with a dispersion mixer, kneader, three-roll mill, and the like. The mixing ratio is preferably 1 to 6 parts by weight of the fine particles of a rubber (as a solid rubber component) per 100 parts by weight of the epoxy resin.

The epoxy resin is not specified but includes any conventional epoxy resins. Commercially available products are, for example, Epikote 828 and 871 (manufactured by Shell Chemical, U.S.A.), Epiclone 830 (manufactured by Dainippon Ink and Chemicals, Inc., Japan), DEW 431 and 732 (manufactured by Dow Chemical, U.S.A.), Eponite 028 (manufactured by Nitto Kasei Kogyo K.K., Japan), EPU-6 (manufactured by Asahi Denka Kogyo K.K., Japan), and the like.

The epoxy resin composition obtained may optionally be subjected to a heat treatment at 80° to 150° C. for 1 to 24 hours. The composition thus heat-treated shows further improved properties, such as resistance to sag when applied to, and further more improved peel strength when cured, and hence, the composition can be applied to even in water without floating of the composition. Alternatively, a part of the epoxy resin is mixed with the fine particles of a rubber and subjected to the heat-treatment, and thereafter, the thus heat-treated mixture is mixed with the remaining epoxy resin, by which similar effect can be achieved.

The epoxy resin composition of this invention is usually used together with a curing agent.

The curing agent includes conventional curing agents curable at room temperature and also curing agents curable with heating. The curing agents include, for example, acid anhydrides such as methylnadic anhydride, dodecenylsuccinic anhydride, tetrahydrophthalic anhydride, hexahydrophthalic anhydride, methylendomethylene tetrahydrophthalic anhydride, anhydrous ethylene glycol trimellitate, methyl tetrahydrophthalic anhydride, and methyl hexahydrophthalic anhydride; imidazole and it derivatives, such as imidazole, 2-methylimidazole, 2-ethyl-4-methylimidazole, 2-phenylimidazole, 2-undecylimidazole, 2-heptadecylimidazole, 1-benzyl-2-methylimidazole, 1-cyanoethyl-2-methylimidazole, 1-cyanoethyl-2-phenylimidazole, 1-cyanoethyl-2-ethyl-4-methylimidazole, 1-cyanoethyl-2-methylimidazole trimellitate, 1-cyanoethyl-2-methylimidazole trimellitate, 2,4-diamino-[6-2'-methylimidazolyl-(1')]-ethyl-s-triazine, 2,4diamno-6[2'-undecylimidazol -1-cyanoethyl-2-phenylimidazole trimellitate, 2,4-diamino-6[2'-methylimidazolyl-(1')]-ethyl-s-triazine, 2,4-diamino-6-[2'-undecylimidazolyl-[1')]-ethyl-s-triazine, 2,4 diamino-6-[2'-ethyl-4'-methylimidazolyl-(1')]-ethyl-striazine, 1-cyanoethyl-2-ethyl-4-methylimidazole trimellitate, 1-cyanoethyl-2-undecylimidazole trimellitate, 1-dodecyl-2-methyl-3-benzoylimidazolium chloride, 1,3-dibenzyl-2-methylimidazolium chloride; dicyandiamide or its derivatives; organic dihydrazides such as sebacic acid dihydrazide; urea derivatives such as 3-(3,4-dichlorophenyl)-1,1-dimethylurea; polyamidoamines; modified polyamines, fluoroborone-monoethylamine complex; and the like. These curing agents may be used in an appropriate amount in accordance with the utilities of the composition and also the kinds of the curing agents, but are usually used in an amount of 5 to 150 parts by weight to 100 parts by weight of the epoxy resin.

The composition of this invention may optionally be incorporated by other additives, such as fillers (e.g. calcium carbonate, talc, clay, asbestos, mica, carbon black, silicic acid, silicate, organic bentonite, aluminum powder, iron powder, copper powder, etc.), reactive diluents [e.g. Eponit 017 (an epoxy resin manufactured by Nitto Kasei K.K., Japan), Cardura E (an epoxy resin manufactured by Shell Chemical, U.S.A.), etc.], non-reactive diluents (e.g. dibutyl phthalate, tricresyl phosphate, xylylene resin, etc.), other various diluents, pigments (e.g. red oxide, chromium oxide, cadmium yellow, etc.), rust preventives (e.g. metal chromates, condensed aluminum phosphate, barium borate, etc.), and the like.

The present invention is illustrated by the following Preparation and Examples but should not be construed to be limited thereto.

PREPARATION

Water (392 parts by weight) and hydrous silicic acid having a mean particle size of 0.016 μm (168 parts by weight) are mixed in a ball mill for 12 hours to give an aqueous dispersion of hydrous silicic acid. The aqueous dispersion is stirred with a stirrer and thereto is added a carboxylated NBR latex (mean primar particle size: 0.2 μm, solid component: 40 % by weight, manufactured by Dainippon Ink and Chemicals, Inc., Japan) (240 parts by weight), and the mixture is continuously stirred for 10 minutes. The mixture is dried with a spray drier under the conditions of an inlet temperature of 100° C., an outlet temperature of 100° C. and a disc velocity of 24,000 r.p.m., and passed through a mesh (80 mesh) to give fine particles of rubber adhered on the surface thereof with fine particles of silicic acid (particle size: not more than 177 μm, mean rubber component in the particles: 36.4 % by weight).

EXAMPLE 1

An epoxy resin (Epikote 828, manufactured by Shell Chemical) (100 parts by weight), the fine particles obtained in the above Preparation (11 parts by weight) and a filler (silicic anhydride) (5 parts by weight) are uniformly mixed with a three-roll mill to give an epoxy resin composition of this invention.

EXAMPLE 2

To an epoxy resin (Epikote 828) (75 parts by weight) is added with stirring the fine particles obtained in the above Preparation (13.2 parts by weight, and the mixture is well mixed with stirring, and thereafter, the mixture is heat-treated at 120° C. for 4 hours to give a heat-treated composition.

The heat-treated composition obtained above (60 parts by weight), an epoxy resin (Epikote 828) (50 parts by weight) and a filler (silicic anhydride) (5 parts by weight) are uniformly mixed to give an epxoy resin composition of the invention.

EXAMPLE 3

In the same manner as described in Example 2, a heat-treated composition is obtained.

To the composition thus obtained an epoxy resin (50 parts by weight) [Epikote 828 (20 parts by weight) and EPU manufactured by Asahi Denka Kogyo K.K., Japan (30 parts by weight)]and a filler (silicic anhydride) (5 parts by weight), and the mixture is uniformly mixed with a three-roll mill to give an epoxy resin composition of the invention.

EXAMPLE 4

To the composition obtained in Example 1 (116 parts by weight) are added dicyandiamide (5 parts by weight) and 3-(3,4-dichlorophenyl)-1,1-dimethylurea (5 parts by weight), and the mixture is well mixed with a three-roll mill to give an epoxy resin composition of the invention which contains a curing agent.

EXAMPLE 5

To the composition obtained in Example 2 (115 parts by weight) are added dicyandiamide (5 parts by weight) and 3-(3,4-dichlorophenyl)-1,1-dimethylurea (5 parts by weight), and the mixture is well mixed with a three-roll mill to give an epoxy resin composition of the invention which contains a curing agent.

EXAMPLE 6

To the composition obtained in Example 2 (115 parts by weight) are added dicyandiamide (5 parts by weight) and an imidazole curing agent ($C_{17}Z$, manufactured by Shikoku Kasei K.K., Japan) (4 parts by weight), and the mixture is well mixed with a three-roll mill to give an epoxy resin composition of the invention which contains a curing agent.

EXAMPLE 7

To the composition obtained in Example 3 (115 parts by weight) are added dicyandiamide (5 parts by weight) and an imidazole curing agent ($C_{17}Z$) (4 parts by weight), and the mixture is well mixed with a three-roll mill to give an epoxy resin composition of the invention which contains a curing agent.

As to the epoxy resin compositions containing a curing agent as obtained in the above Examples 4 to 7, the following properties were tested as follows.

(1) Test of shear strength

A steel plate (JIS G 3141) (1.6×25×150 mm) was treated with toluene to degrease the surface thereof. To the surface of the steel plate was applied the composition to be tested, and thereon was piled another steel plate which was degreased likewise and the laminated plates were pressed (adhesion area: 3.125 cm$^2$) and cured by heating at 150° C. for 30 minutes to give a test sample. As to the test sample, a strength under shear was measured at a cross-head speed of 5 mm/minute with an autograph (IS-500, manufactured by Shimadzu Corporation, Japan).

(2) Peel strength test

In the same manner as described in the above (1), a test sample was prepared by using a steel plate (JIS G 3141) (0.8×25×150 mm) (adhesion area: 25 cm$^2$). As to the test sample, a peel strength at 90° was measured at a cross-head speed of 200 mm/minute with an autograph.

(3) Flexural test

The composition was flowed into a mold (5×10×100 mm) and cured by heating at 150° C. for 30 minutes to give a test sample. As to the test sample, a flexural strength and degree of deformation were measured at a flexural rate of 5 mm/minute with an autograph in a similar method as described in JIS K 6911.

The results of the above tests are shown in the following Table 1.

As a reference, the tests were carried out as to a composition (Control 1) which was prepared from an epoxy resin (Epikote 282) (100 parts by weight), a filler (silicic anhydride) (5 parts by weight), dicyandiamide (5 parts by weight) and 3-(3,4-dichlorophenyl)-1,1-dimethylurea (5 parts by weight) and also as to a composition (Control 2) which was prepared from an epoxy resin (100 parts by weight) [Epikote 828 (70 parts by weight) and EPU-6 (30 parts by weight)], a filler (silicic anhydride) (5 parts by weight), dicyandiamide (5 parts by weight) and an imidazole curing agent ($C_{17}Z$) (4 parts by weight).

TABLE 1

| Ex. No. of composition | Sear strength | Peel strength | Flexural strength | Degree of deformation |
| --- | --- | --- | --- | --- |
| Ex. 4 | 272 kg/cm$^2$ | 16 kg/25 mm | — | — |
| Ex. 5 | 342 kg/cm$^2$ | 29 kg/25 mm | 9.8 kg/mm$^2$ | 3.25 mm |
| Ex. 6 | 295 kg/cm$^2$ | 11 kg/25 mm | — | — |
| Ex. 7 | 277 kg/cm$^2$ | 23 kg/25 mm | — | — |
| Cont. 1 | 260 kg/cm$^2$ | <2 kg/25 mm | 3.7 kg/mm$^2$ | 1.25 mm |
| Cont. 2 | 270 kg/cm$^2$ | 5 kg/25 mm | — | — |

As is clear from the above Table 1, the epoxy resin compositions of this invention showed far larger peel strength after cured in comparison with the composition of controls, and further showed about 3 times larger than the controls in the flexural strength and the degree of deformation. Thus, the composition of this invention has remarkably improved peel strength and toughness after cured.

What is claimed is:

1. An epoxy resin composition comprising a uniform mixture of an epoxy resin and fine particles of a rubber adhered uniformly on the surface thereof with fine particles of an inorganic material, said fine particles of a rubber being prepared by dispersing uniformly fine particles of an inorganic material in a rubber latex and drying the dispersion.

2. The composition according to claim 1, wherein the fine particles of an inorganic material are water-insoluble and have a particle size of not more than about 200 μm.

3. The composition according to claim 2, wherein the fine particles have a particle size of not more than about 50 μm.

4. The composition according to claim 1, wherein the fine particles of a rubber are prepared by dispersing fine particles of a water-insoluble inorganic material in a rubber latex containing primary particles of a particle size of about 0.01 to 5 μm, said fine particles of a rubber being used in an amount of 30 to 300 parts by weight to 100 parts by weight of the solid component of the rubber latex.

5. The composition according to claim 1, wherein the inorganic material is a member selected from the group consisting of silicic acid, a silicate, talc, calcium carbonate, and carbon black.

6. The compositiion according to claim 5, wherein the inorganic material is a member selected from silicic acid and a silicate.

7. The composition according to claim 1, wherein the inorganic material has a particle size of about 0.01 to 150 μm.

8. The composition according to claim 1, wherein the rubber latex is an acrylonitrile-butadiene rubber latex.

9. The composition according to claim 1, wherein the rubber latex is a carboxylated acrylonitrile-butadiene rubber latex.

10. The composition according to claim 1, wherein the fine particles of a rubber are incorporated in an amount of 1 to 6 parts by weight as a rubber component to 100 parts by weight of an epoxy resin.

11. The composition according to claim 1, which is subjected to heat-treatment at 80° to 150° C. for 1 to 24 hours.

12. The composition according to claim 1, wherein a curing agent is further incorporated.

* * * * *